US010711606B2

(12) United States Patent
Hull et al.

(10) Patent No.: US 10,711,606 B2
(45) Date of Patent: Jul. 14, 2020

(54) REAL-TIME ONSITE MECHANICAL CHARACTERIZATION OF WELLBORE CUTTINGS

(71) Applicant: Saudi Arabian Oil Company, Dhahran (SA)

(72) Inventors: Katherine Leigh Hull, Houston, TX (US); Younane N. Abousleiman, Norman, OK (US)

(73) Assignee: Saudi Arabian Oil Company, Dhahran (SA)

( * ) Notice: Subject to any disclaimer, the term of this patent is extended or adjusted under 35 U.S.C. 154(b) by 191 days.

(21) Appl. No.: 15/593,099

(22) Filed: May 11, 2017

(65) Prior Publication Data
US 2018/0328171 A1    Nov. 15, 2018

(51) Int. Cl.
| E21B 49/00 | (2006.01) |
| E21B 21/06 | (2006.01) |
| G01N 3/42 | (2006.01) |
| E21B 43/26 | (2006.01) |
| G01N 1/26 | (2006.01) |
| G01N 1/28 | (2006.01) |
| G01N 1/36 | (2006.01) |

(52) U.S. Cl.
CPC .......... *E21B 49/005* (2013.01); *E21B 21/065* (2013.01); *G01N 3/42* (2013.01); *E21B 43/26* (2013.01); *G01N 2001/2866* (2013.01); *G01N 2001/2873* (2013.01); *G01N 2001/364* (2013.01); *G01N 2203/0078* (2013.01)

(58) Field of Classification Search
CPC ........ E21B 49/00; E21B 21/06; E21B 49/005; E21B 21/065; E21B 43/26
See application file for complete search history.

(56) References Cited

U.S. PATENT DOCUMENTS

| 830,437 A | 9/1906 | Humphrey |
| 6,349,595 B1 * | 2/2002 | Civolani ............... E21B 49/005 73/152.02 |
| 2013/0269933 A1 | 10/2013 | Pomerantz et al. |

(Continued)

FOREIGN PATENT DOCUMENTS

| CN | 105445440 | 3/2016 |
| WO | 2017040834 | 3/2017 |

OTHER PUBLICATIONS

Accessed on Mar. 6, 2019 Geomechanics field characterization of Woodford Shale and Barnett Shale with advanced tools and nano-indentation on drill cuttings published on Jun. 2010 via https://library.seg.org/doi/pdf/10.1190/1.3447787 (Year: 2010).*

(Continued)

*Primary Examiner* — David J Bagnell
*Assistant Examiner* — Manuel C Portocarrero
(74) *Attorney, Agent, or Firm* — Fish & Richardson P.C.

(57) ABSTRACT

Realtime on-site mechanical characterization of wellbore cuttings is described. At a surface of a wellbore being drilled at a wellbore drilling site, multiple cuttings resulting from drilling the wellbore are received. At the wellbore drilling site, nano-indentation tests on each of the multiple cuttings are performed. At the wellbore drilling site, mechanical properties of the multiple cuttings are determined based on the results of the nano-indentation tests.

21 Claims, 8 Drawing Sheets

(56) References Cited

U.S. PATENT DOCUMENTS

2014/0048694 A1    2/2014   Pomerantz

OTHER PUBLICATIONS

Ulm et al., "The nanogranular nature of shale," Acta Geotechnica, Springer, vol. 1, No. 2, Jun. 15, 2006, 12 pages.
International Search Report and Written Opinion issued in International Application No. PCT/US2018/03093 dated Jul. 19, 2018, 16 pages.
"Field-Deployable Solution for Nanoporosity Measurements in Mud Logging Operations and a Novel Method for Fracability Analysis Using Mud Cuttings," Agilent Technologies, Oct. 2013, 44 pages.
Abousleiman et al., "SPE 110120: Geomechanics Field and Laboratory Characterization of Woodford Shale: The Next Gas Play," SPE International, presented at the 2007 SPE Annual Technical Conference and Exhibition, Nov. 11-14, 2007, 14 pages.
Abousleiman et al., "SPE 124428: GeoMechanics Field Characterization of the Two Prolific U.S. Mid-West Gas Plays with Advanced Wire-Line Logging Tools," SPE International, presented at the 2009 SPE Annual Technical Conference and Exhibition, Oct. 4-7, 2009, 19 pages.
Abousleiman et al., "Geomechanics field characterization of Woodford Shale and Barnett Shale with advanced logging tools and nano-indentation on drill cuttings," The Leading Edge, Jun. 2010, 6 pages.
Corapcioglu, "Fracturing Fluid Effects on Young's Modulus and Embedment in the Niobrara Formation," Thesis for degree of Master of Science (Petroleum Engineering), Colorado School of Mines, 2014, 189 pages.
De Block et al., "SPE-177601-MS: A New Solution for the Characterization of Unconventional Shale Resources Based on Analysis or Drill Cutting," SPE International, presented at the Abu Dhabi International Petroleum Exhibition and conference, Nov. 9-12, 2015, 6 pages.
Delafargue and Ulm, "Explicit approximations of the indentation modulus of elastically orthotropic solids for conical indenters," International Journal of Solids and Structures vol. 41, Issue 26, Dec. 2004, 10 pages.
Elijah, "Numerical Modeling of Wellbore Instability (Tensile Failure) Using Fracture Mechanics Approach," Thesis for the degree of Master of Science, African University of Science and Technology Abuja, May 2013, 77 pages.
Glover et al., "ARMA 16-0737: The Use of Measurements Made on Drill Cuttings to Construct and Apply Geomechanical Well Profiles," ARMA, presentation at the 50th US Rock Mechanics/Geomechanics Symposium, Jun. 26-29, 2016, 11 pages.
Kumar et al., "SPE 159804: Nano to Macro Mechanical Characterization of Shale," SPE International, presented at the SPE Annual Technical Conference and Exhibition, Oct. 8-10, 2012, 23 pages.
Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.
Shukla et al., "ARMA 13-578: Nanoindentation Studies on Shales," ARMA, presented at the 47th US Rock Mechanics/Geomechanics Symposium, Jun. 23-26, 2013, 10 pages.
Oliver and Pharr, "An improved technique for determining hardness and elastic modulus using load and displacement sensing indentation experiments," Journal of Materials Research, vol. 7, No. 6, Jun. 1992, 20 pages.
Oliver and Pharr, "Measurement of hardness and elastic modulus by instrumented indentation: Advances in understanding and refinements to methodology," Journal of Materials Research, vol. 19, No. 1, Jan. 2004, 18 pages.
Gulf Cooperation Council Examination Report issued in GCC Application No. 2018-35266 dated Nov. 25, 2019, 3 pages.

* cited by examiner

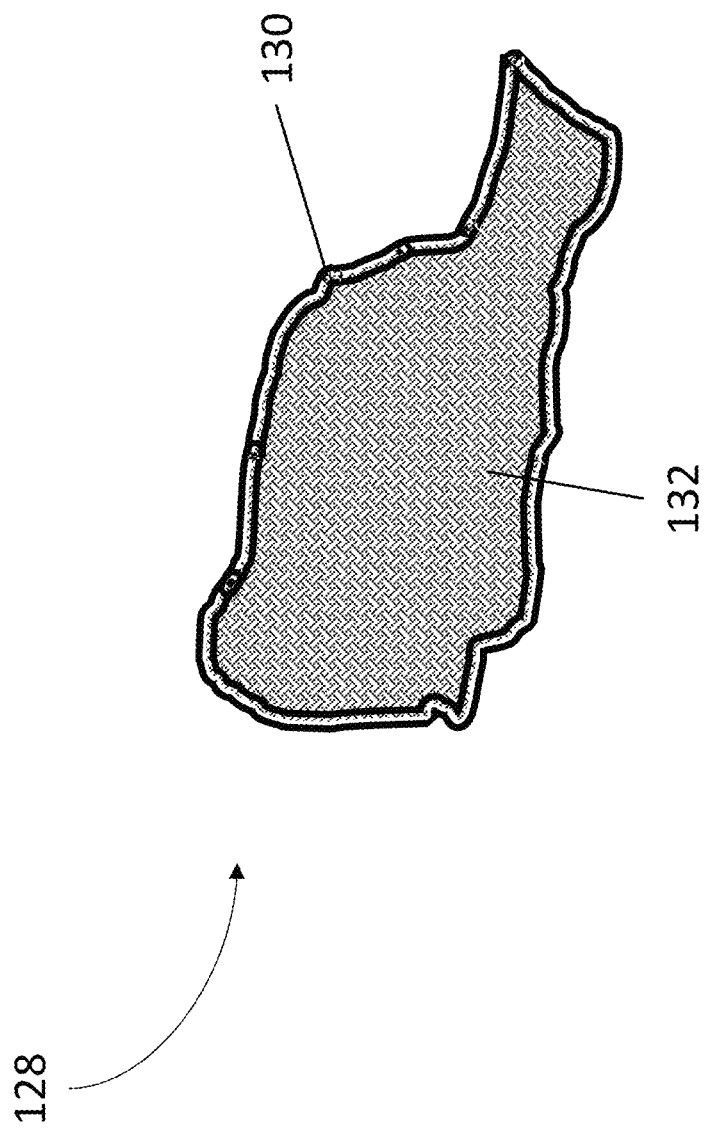

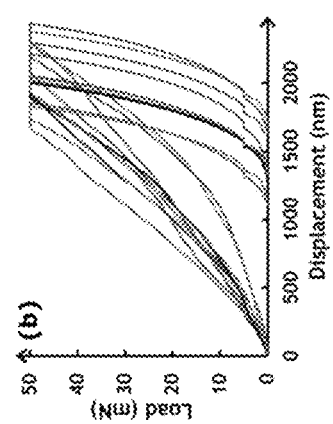
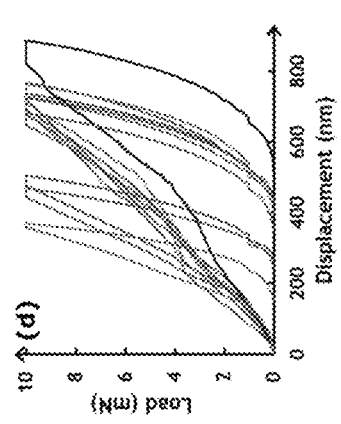
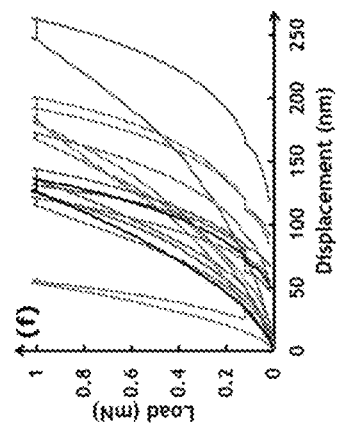
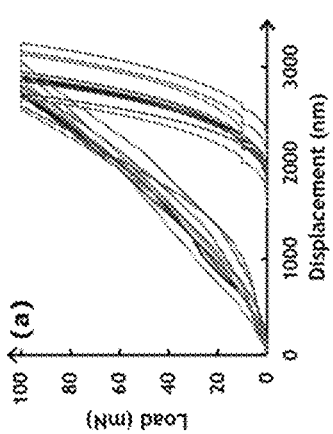
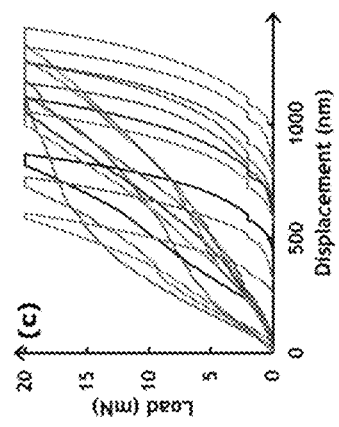
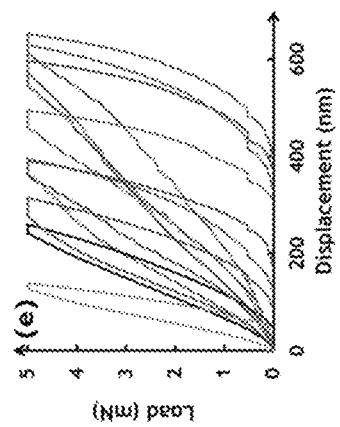
FIG. 3A
FIG. 3B
FIG. 3C
FIG. 3D
FIG. 3E
FIG. 3F

REAL-TIME ONSITE MECHANICAL CHARACTERIZATION OF WELLBORE CUTTINGS

TECHNICAL FIELD

This specification relates to determining mechanical properties of a wellbore.

BACKGROUND

In hydrocarbon production, a wellbore is drilled into a hydrocarbon bearing geologic formation. In some instances, a completed wellbore is fractured to increase the production rate of the completed wellbore. Mechanical properties of the formation can be analyzed to enhance hydrocarbon production, optimize fracturing operations or to improve other formation-related operations. Sonic logs are sometimes employed to estimate the mechanical properties of geologic formations. Such logs can be costly, time consuming, and have limited capability and accuracy. For example, logging tools are not able to estimate the stiffness in the in-plane direction as it is needed in hydraulic fracturing operational planning. Another source of information about the properties of the formation are wellbore cuttings that are formed when the wellbore is drilled into the formation.

SUMMARY

This specification describes technologies relating to real-time onsite mechanical characterization of wellbore cuttings.

Certain aspects of the subject matter described here can be implemented as a method. At a surface of a wellbore being drilled at a wellbore drilling site, multiple cuttings resulting from drilling the wellbore are received. At the wellbore drilling site, nano-indentation tests on each of the multiple cuttings are performed. At the wellbore drilling site, mechanical properties of the multiple cuttings are determined based on the results of the nano-indentation tests.

This, and other aspects can include one or more of the following properties. The mechanical properties of the multiple cuttings can include stiffness transverse isotropy properties of the multiple cuttings. The nano-indentations can be performed over a period of time. To determine the mechanical properties of the multiple cuttings based on the results of the nano-indentation tests, a log of the mechanical properties can be generated over time. To perform the nano-indentation tests, each cutting can be indented with an indentation load ranging between 1 milli-Newton and 100 milli-Newton. The indentation loads can be increased or decreased in multiples of 10. Each cutting can be indented to a depth greater than a surface roughness of the cutting. The depth can be at least one micrometer. The multiple cuttings received at the surface of the wellbore can be in an unprocessed state. The nano-indentation tests can be performed at the wellbore drilling site on each of the multiple cuttings in the unprocessed state. To perform a nano-indentation test on a cutting of the multiple cuttings, the cutting can be sliced into two cutting portions. A first of the two cutting portions can be mounted with bedding planes parallel to a direction of an indenter force of a nano-indentation test apparatus. A second of the two cutting portions can be mounted with bedding planes perpendicular to a direction of the indenter force of the nano-indentation test apparatus. To perform the nano-indentation test on the cutting, each of the two cutting portions can be indented at least five times. An indentation curve responsive to each indenting can be generated resulting in multiple indentation curves. To determine, at the wellbore site, the mechanical properties of the multiple cuttings based on the results of the nano-indentation tests, an indentation modulus can be determined from each indentation curve resulting in multiple indentation moduli for the corresponding multiple indentation curves. A respective average indentation modulus for each of the two cutting portions can be determined using the multiple indentation moduli. Transverse isotropic mechanical properties of the multiple cuttings using the two average indentation moduli can be determined. The wellbore can be drilled in a shale formation. The multiple cuttings can include multiple shale cuttings. Mechanical properties of the wellbore can be determined based on the results of the nano-indentation tests. A hydraulic fracturing operation can be planned within the wellbore based on the mechanical properties of the wellbore or drilling operations to drill one or more other wellbores adjacent the wellbore can be planned based on the mechanical properties of the wellbore.

Certain aspects of the subject matter described here can be implemented as a method. While drilling a wellbore in a geologic formation, multiple cuttings resulting from drilling the wellbore are collected. At a wellbore drilling site, nano-indentation tests are performed on each of the multiple cuttings. Each cutting is unprocessed after collecting the multiple cuttings at a surface of the wellbore. Mechanical properties of the multiple cuttings are determined using results of the nano-indentation tests. Mechanical properties of the wellbore are determined using the mechanical properties of the multiple cuttings.

This, and other aspects, can include one or more of the following features. The multiple cuttings can include multiple shale cuttings. To perform the nano-indentation tests, each of the multiple cuttings can be indented to a depth greater than a surface roughness of each of the multiple cuttings. To perform the nano-indentation tests, each of the multiple cuttings can be split into two cutting portions. A nano-indentation force in a direction parallel to bedding planes can be applied to a first of the two portions, and a nano-indentation force in a direction perpendicular to bedding planes can be applied to a second of the two portions.

Certain aspects of the subject matter described here can be implemented as a method. While drilling a wellbore in a geologic formation, multiple shale cuttings resulting from drilling the wellbore are collected. At a wellbore drilling site and while drilling the wellbore, nano-indentation tests are performed on each of the multiple shale cuttings. A nano-indentation on a shale cutting includes indenting the shale cutting to a depth greater than a surface roughness of the shale cutting. Mechanical properties of the multiple cuttings are determined using results of the nano-indentation tests. Mechanical properties of the wellbore are determined using the mechanical properties of the multiple cuttings.

This, and other aspects, can include one or more of the following features. Each of the multiple shale cuttings can be transported to a nano-indentation test apparatus at the wellbore drilling site without performing any intermediate processing on each cutting. The nano-indentations can be performed using the nano-indentation test apparatus.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1C is a schematic diagram of an example drill cutting.

FIGS. 3A-3F are example load-displacement curves determined by the nano-indentation test apparatus.

Like reference numbers and designations in the various drawings indicate like elements.

DETAILED DESCRIPTION

Figure 1A:
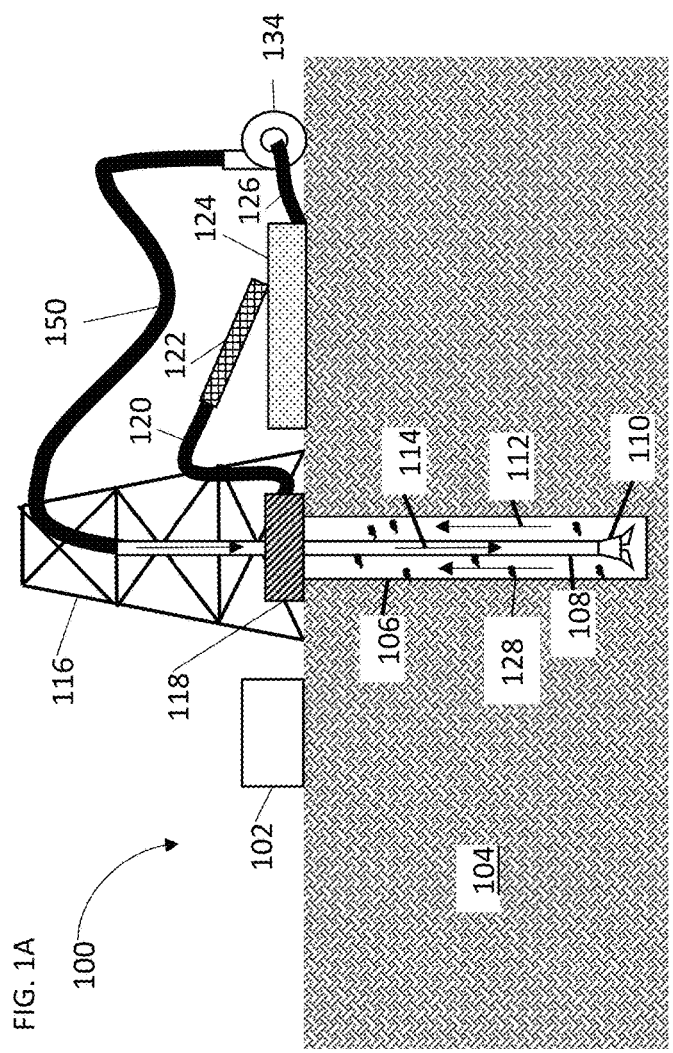
FIG. 1A is a schematic diagram showing a side-view of an example wellbore drilling site.

This disclosure describes a method for characterizing material properties of wellbore cuttings in real-time and on-site during drilling operations. As cuttings are circulated to the surface of a wellbore during drilling operations, they are directed to a shaker table. Cuttings are taken from the shaker table and subjected to nano-indentation tests in the field to determine mechanical properties. The cuttings subjected to testing are in their raw, unpolished form. In particular, the nano-indentation test is performed to a greater depth compared to a similar test for a polished cutting. Each sample is tested multiple times and properties are determined based on the average of the tests. Multiple samples can be taken from the same cutting batch to verify measurements or check mechanical properties along different directions and planes.

Nano-indentation has been established as a technique for determining the mechanical properties of material such as hardness and Young's modulus. Nano-indentation is performed by pressing a tip with known geometry and mechanical properties into the surface of a material. The applied load and the depth of the tip are recorded while the indenter loads, holds for a period of time, then unloads. The resulting load-displacement curve can be analyzed to determine the unloading stiffness from the initial elastic unloading curve after reaching the maximum load. The projected contact area can be estimated based on the maximum indentation depth. From these values, the indentation hardness and indentation modulus can be determined.

For materials such as shale, which are characterized by transverse anisotropic elasticity, the indentation moduli are measured normal and parallel, respectively, to the axis of symmetry and can be related to the five elastic constants of the material. The values of both of the Young's Moduli of the rock formation can be used for hydraulic fracturing simulation and field planning operation and optimization. In the case of shale formations, the transverse isotropy of shale, which is the result of sedimentation, produces bedding planes. The apparent stiffness of the rock depends upon the direction of indenter force related to the bedding planes. In some implementations, hydraulic fracturing of the formation in which the wellbore was drilled can be performed based on the simulated hydraulic fracturing and the planned and optimized field operation. In some implementations, the mechanical parameters captured from the cuttings in real-time can be used either alongside or in place of gamma rays for geosteering operations to direct the drill bit during the drilling process.

Certain laboratory preparation of shale samples for nano-indentation involves mechanical grinding using first a silicon carbide paper, such as 600 and 1200 grit, then polishing with progressively finer diamond suspensions until reaching the desired degree of surface roughness. Specimens can be further polished with an argon ion mill to achieve an even flatter surface. Another laboratory sample preparation method involves embedding a set of drilling cuttings in epoxy, and forming a small block. For example, Woodford shale chips of different drill-cuttings sizes can be mixed with epoxy to form tiny solid blocks (1 cm×1 cm×1 cm) for nano-indentation testing and mechanical characterization. Pure epoxy cubes are also prepared for nano-indentation in order to determine the mechanical properties associated only with the epoxy when using this technique.

All of the techniques discussed earlier can alter the mechanical properties of the samples and yield questionable results. In addition to the risk of contaminating samples during testing preparation, the simple act of transporting the sample any distance can compromise the integrity of such tests as well. Transporting cutting samples from the rig site to the laboratory environment subjects the shale to the elements (temperature, humidity, vibration, pore pressure depletions, etc.). This further renders the off-site laboratory results to be questionable.

By performing nano-indentation in the field (that is, at the drilling site or the rig site) the Young's Moduli measurement can be done either parallel or perpendicular to the axis of symmetry. Such measurements can be performed rapidly in real-time on raw, unprocessed drill cuttings to extract the anisotropic mechanical properties of the formation. By "real-time", it is meant that the Young's Moduli measurement on the fresh cuttings can be performed as soon as the cuttings are surfacing at the well and passed to the shaker. That is, the raw cuttings are not exposed when transferring to a controlled laboratory environment, and there is minimal time delay from cutting to testing. The drill cuttings provide samples which are as close as possible to in situ conditions with minimal mechanical and pressure dissipations. By performing indentation in the field (that is, at the wellbore drilling site), rapid and real-time analysis on fresh drill cuttings which are unprocessed and as close to in situ conditions as possible is made possible.

Moreover, using the techniques described here enables determining four elastic constants: E1, E3, C44 and C66 with the following equations:

$$E_3 = 2\sqrt{\frac{C_{11}C_{33} - (C_{13})^2}{C_{11}}\left(\frac{1}{C_{44}} + \frac{2}{\sqrt{C_{11}C_{33}} + C_{13}}\right)^{-1}} \quad (1)$$

$$E_1 = \sqrt{\sqrt{\frac{C_{11}}{C_{33}}}\frac{(C_{11})^2 - (C_{12})^2}{C_{11}}E_3} \quad (2)$$

Where E1 and E3 are the Young's Moduli of the rock formation, related to C11, C22, C12 and C13, and C33 while C44 and C66 are the remaining stiffness parameters in a transversely isotropic material, that are related to the shear moduli. In addition, because the cuttings are tested immediately after being received at the surface, the tested cuttings suffer minimal pressure dissipation and mechanical alteration compared to when the cuttings were first formed downhole. The information gathered by the testing techniques described here can be used to build a new mechanical well log on-site as the drill cuttings are tested.

Figure 1B:
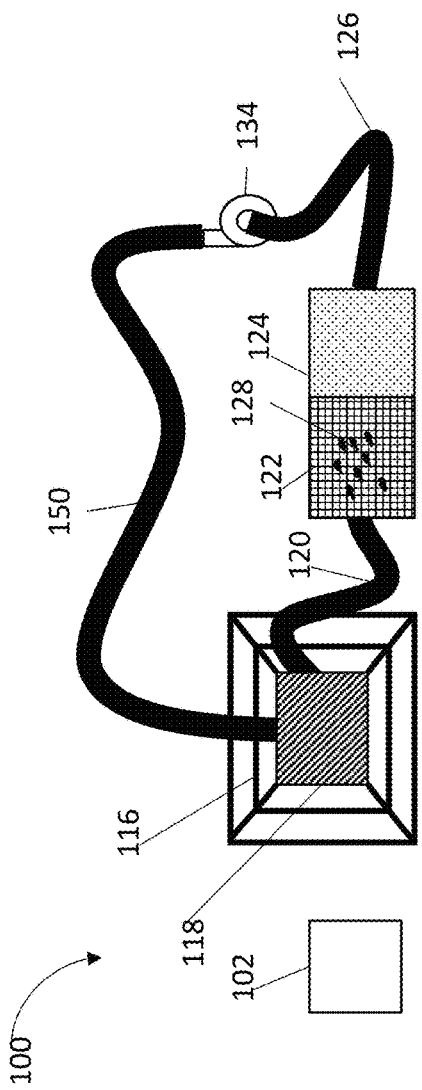
FIG. 1B is a schematic diagram showing a top-down view of the example wellbore drilling site.

FIGS. 1A-1B show schematic diagrams of an example wellbore drilling site 100. The drilling site includes a drilling derrick 116 that supports a drill string 108 during drilling operations. During the drilling process, a drill bit 110 pulverizes part of a geologic formation 104 as the drill bit 110 forms a wellbore 106 within the geologic formation 104. During drilling operations, clean drilling mud 114 flows down the drill string 108 and out the drill bit 110. The clean drilling mud 114 helps provide static pressure on the geologic formation 104, provides lubrication and cooling to the drill bit 110, and removes the pulverized pieces of the formation, also called cuttings 128, from the wellbore 106. After emerging from the drill bit 110 and collecting the cuttings 128, the clean drilling mud 114 becomes saturated drilling mud 112. The saturated drilling mud 112 carries cuttings 128 through the wellbore 106 in an uphole direction towards a top-side facility, such as the top-side facility included in the example wellbore drilling site 100.

Atop the wellbore is a well tree and blow out preventer (BOP) 118. The well tree and BOP 118 at least partially control the wellbore 106 during drilling operations, for example, by sealing the wellbore 106 in the event that the geologic formation 104 over pressures either the clean mud 114 or the saturated mud 112 resulting in a blow-out. Under normal drilling operations, the saturated mud 112 flows from the well tree and BOP 118, through a first flow path 120, and into a shaker table 122. The first flow path 120 can include piping, hoses, open conduits, any other flow path, or any combination. The shaker table 122 includes a screen with holes small enough to catch the cuttings 128 and allow the saturated mud 112 to flow through.

A more detailed view of a schematic of an example cutting 128 is shown in FIG. 1C. The raw, unprocessed cutting 128 has an outer, damaged layer 130 that has material properties that are not reflective of the wellbore 106. The outer layer 130 is only a few microns thick, and the core 132 of the cutting 128 has material properties that are substantially similar to the wellbore 106.

Figure 2:
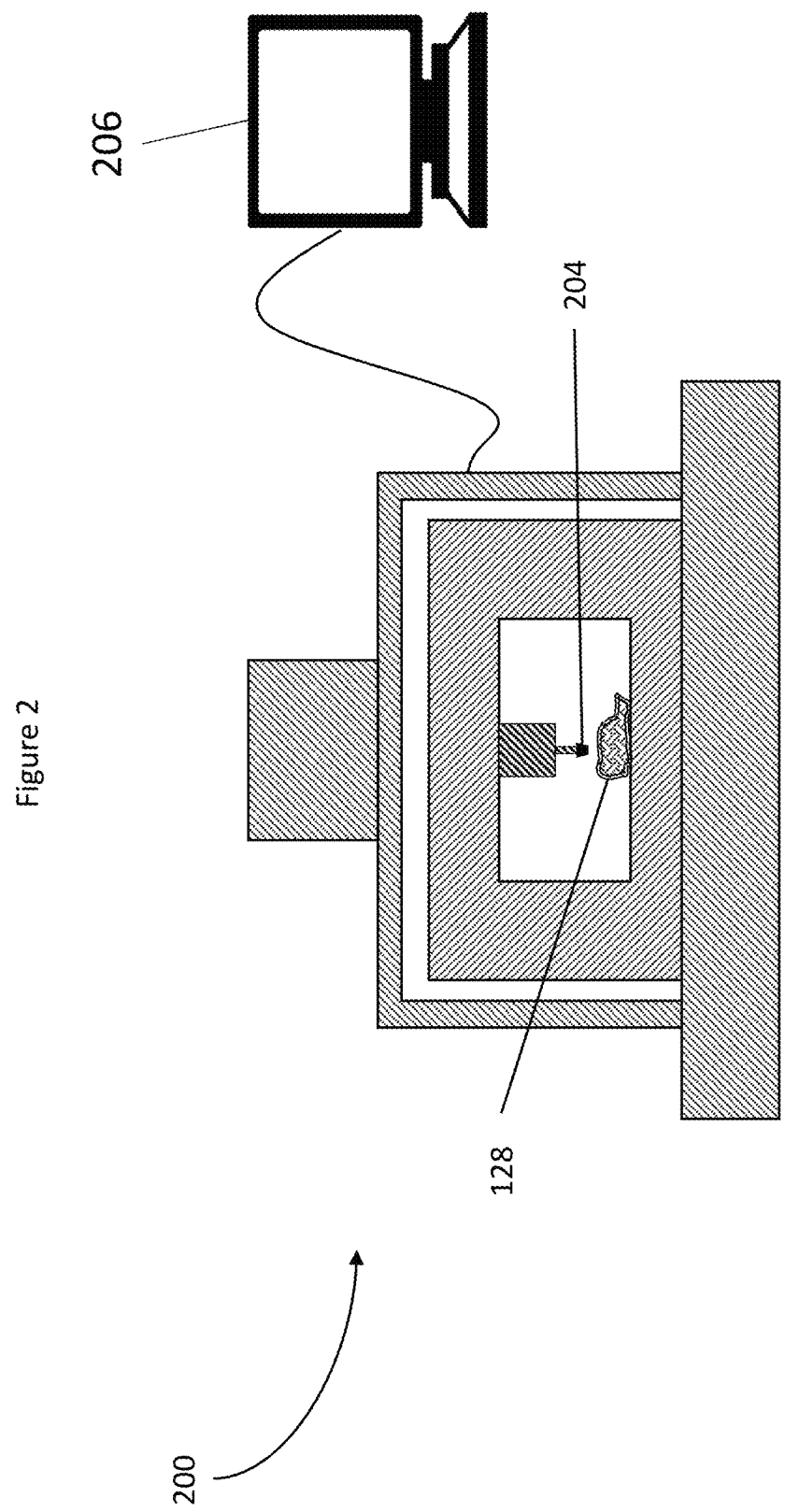
FIG. 2 is a schematic diagram of a nano-indentation test apparatus.

The raw cuttings 128 can be tested to determine properties of the wellbore drilled formation. For example, on-site nano-indentation testing can be performed on the raw cuttings 128. FIG. 2 shows a schematic diagram of a nano-indentation test apparatus 200. The nano-indentation test apparatus 200 can allow direct mechanical measurements at scales ranging from 100 nanometers (nm) to 10 millimeters (mm) in displacement. In addition to being able to apply loads at depths described here, the nano-indentation test apparatus 200 can be sized to be portable, for example, capable of being carried in a container, which, together with the apparatus, is dimensioned and of a weight that can reasonably be carried by a human using one hand. In some implementations, the nano-indentation test apparatus 200 can fit on a bench top. The nano-indentation test apparatus 200 can have sufficient ruggedness to operate in the wellbore drilling site 100. The nano-indentation test apparatus 200 can be sealed to prevent dust particles from entering into the apparatus, and to be housed in a transportable case that is vibration resistant both during transportation and during use of the apparatus. The nano-indentation test apparatus 200 includes a nano-indenter tip 204 that is pressed into a sample, such as the illustrated cutting 128. The tip 204 can be of a smaller scale compared to laboratory model nano-indentation apparatuses that are floor or benchtop models. The nano-indenter tip 204 can be a small indenter cone with an accuracy of 0.1 nm. As the tip 204 is pressed into the cutting 128, a load/displacement curve is produced. Examples of such load curves are shown in FIGS. 3A-3F.

In some implementations, a computer 206 or some other controller can record the load/displacement curve. The computer 206 can be a stand-alone computer or can be integrated in the nano-indentation test apparatus 200. The computer 206 or controller can provide input signals to the nano-indentation test apparatus 200 to perform each test. The computer 206 or controller can also perform operations including one or more of receiving output signals from the nano-indentation test apparatus 200, generating the load/displacement curves in response to the signals from the nano-indention test apparatus 200, and storing any data sent from the nano-indentation test apparatus 200 or produced in response to signals from the nano-indention test apparatus 200. Alternatively, or in addition, the computer 206 can determine transverse anisotropic properties of the cuttings 128, for example, by executing equations 1 and 2 described earlier. Material properties of the drill cuttings 128 can be determined by subjecting the cuttings 128 to a nano-indentation test and analyzing the load/displacement curves.

The drill cuttings 128 received at the surface of the wellbore 106 are in an unprocessed state. That is, the nano-indentation tests are performed at the wellbore drilling site, such as in production lab 102, on each of the cuttings 128 that are in the unprocessed state. In some implementations, the cuttings 128 can be tested with a hand-held nano-indentation test apparatus set up 200, in which case no transportation and time-delayed to rock mechanics laboratory facilities would be needed. The tests can be performed at the rig site, for example, in the open air or, alternatively, in a mobile lab unit at the well site.

In some implementations, the wellbore can be drilled in a shale formation and the cuttings 128 can include shale cuttings. In some implementations, the cuttings are moved from the shale shaker and are cut with a diamond saw with blade thickness in the micron range to minimize material loss. Two specimen are taken from each cutting, one in the parallel bedding plane orientation and one in the perpendicular bedding plane orientation. The indentation tests are performed on a cut (fresh and relatively flat) surface. Indentations are typically performed to at least 3 to 5 micron depth, so the size of the tested cuttings will typically be in the 1 mm thick to a few mm range.

The drill cuttings 128 can be indented directly without polishing. Deeper indentations are performed to ensure that the indenter tip 204 makes full contact with the surface and that the mechanical properties extracted truly represent the material. That is, the indenter tip 204 penetrates beyond the damaged outer layer 130 of the cuttings 128 and collects measurements based on a representative core volume 132 of the cutting 128. The indenter software continuously records both the load applied to the cutting and the depth of the indenter tip into the cutting. At any given time during an experiment, the exact depth of the indenter is known and ultimately the maximum depth achieved corresponding to the maximum load exerted. Alternatively, indentation can be performed by a simple diamond saw cut of the drill cutting 128 to obtain multiple specimen oriented in different directions.

As explained earlier, in some implementations, a saw with a diamond blade is used to cut the drill cutting. This provides a sample surface with topology (roughness) in the range of microns to submicrons. Such a surface is sufficiently smooth for the relatively deep indentations (2-5 microns) that will be performed. By contrast, in a laboratory environment, specimen prepared for nano-indentation would be further processed by grinding, polishing, and in some cases also argon ion milling to achieve a very smooth surface with topology (roughness) in the nm range. This allows very shallow (nm scale) indentations to be performed, that are not necessary for the estimation of field engineering parameters.

In order to determine the appropriate depth to which indentation must be performed in the field to achieve composite material properties, a series of indentations were performed on shale to different depths/loads. Indentations were performed to maximum loads of 100, 50, 20, 10, 5, and 1 mN in multiples of 5 or 10 each. The indenter went to shallower and shallower depths as the tests progressed. Meanwhile, the spread in the data continued to widen as the sampling reached the individual shale components and the surface roughness effects come into play. By indenting to at least a few microns, the mechanical response represents the volume bulk properties. The test to determine indentation depth is performed periodically during the drilling since different zones in the formation will have different properties. For example, the drill cuttings are collected at regular intervals during the drilling process, possibly to within 10's of feet of one rock formation horizon to another.

Figure 4:
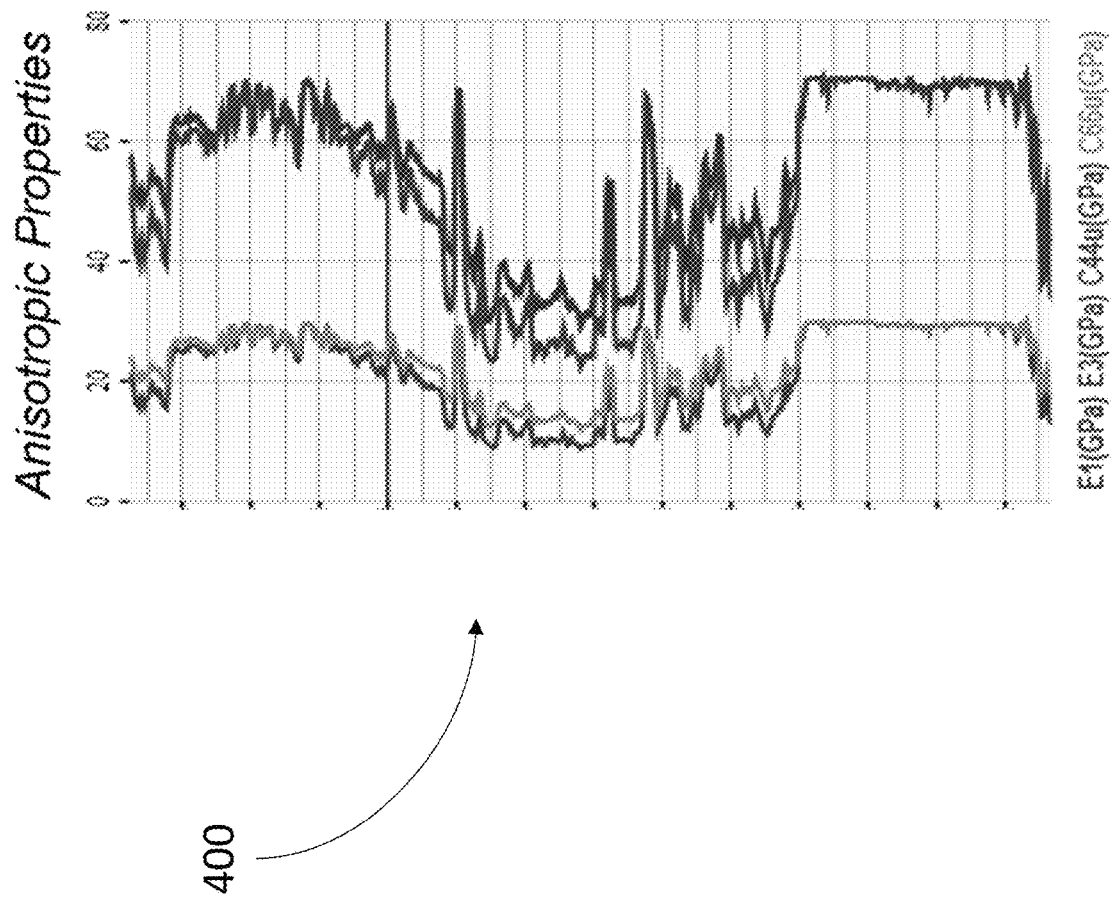
FIG. 4. is an example log of transverse isotropic mechanical parameters as captured across a well interval.

FIG. 4 shows an example drilling log 400 that can be created using the method 300. The indentation moduli of the material are determined from each indentation using the method described above. Once the indentation moduli of the material are determined using nano-indentation, the stiffness transverse isotropy properties can be determined. These properties are determined from cuttings 128 collected in real-time at the rig site, throughout the drilling process, and creating a continuous log 400 across the interval of interest.

Figure 5A:
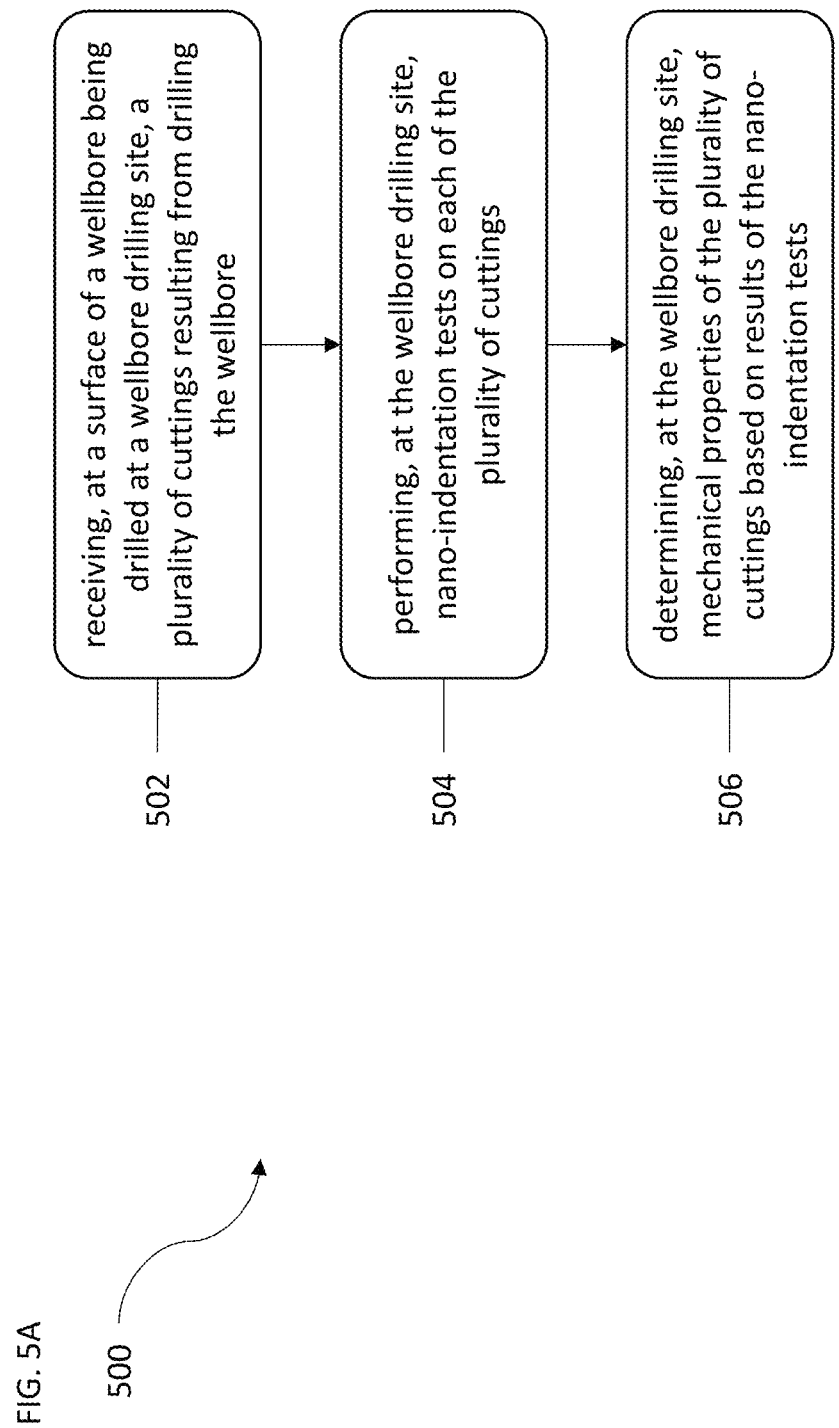
FIGS. 5A-5C are flowcharts of a method for determining mechanical properties of a wellbore onsite and in real-time.

FIG. 5A is a flowchart of an example method 500 for determining mechanical properties of the wellbore 106 onsite and in real-time. At 502, cuttings 128 resulting from drilling the wellbore 106 are received at the surface of the wellbore 106 as the wellbore 106 is being drilled at the wellbore drilling site 100. That is, while drilling the wellbore 106 in a geologic formation 104, cuttings 128 resulting from drilling the wellbore 106 are collected by the shaker table 122. In some implementations, for a formation with a thickness of 100 feet, a specimen can be obtained every 10 feet. Other frequencies for obtaining samples are possible. Each of the shale cuttings 128 is transported to a nano-indentation test apparatus 200 at the wellbore drilling site 100 without performing any intermediate processing on each of the cuttings 128. The test's proximity to the shaker is significant in that there is no time delay, no packing of cuttings, no transportation, etc. The nano-indentation test apparatus is located at the wellbore drilling site 100. For example, the apparatus can be positioned on a bench next to where the drill cuttings 128 are collected or may be housed in the onsite production lab 102). The nano-indentation tests on each of the cuttings 128 is performed at the wellbore rig site 100, such as on the bench or within the production lab 102. In some implementations, the cuttings 128 can include shale cuttings 128. Cuttings 128 can be collected from the shaker table 122.

At 504, nano-indentation tests are performed on each of the cuttings 128 at the wellbore drilling site. The nano-indentation tests can be performed over a period of time. Each of the cuttings 128 is indented to a depth greater than a surface roughness of each of the cuttings 128 for an accurate measurement. Performing the nano-indentation tests includes indenting each cutting 128 with an indentation load ranging between 1 milli-Newton (mN) and 100 mN. The indentation loads can be increased or decreased in multiples of 10. Performing the nano-indentation tests includes indenting each cutting 128 to a depth greater than a surface roughness of each cutting 128, such as a depth of at least one micrometer. The number of indentations per sample is sample size and time dependent. At least 10 indentations will give a good approximation of the mechanical parameters, but more indentations will provide even better results. The spacing between indentations is in the micron size range, typically at least 10 microns apart and most likely in the range of a few 10's of microns. The cuttings are collected during drilling, and the testing begins as soon as the first diamond sawed cuttings are available. Each cutting produces two test specimen (parallel and perpendicular orientation), and at least one cutting (two specimen) is tested in each chosen rock formation interval sampled. When possible, cuttings from the same horizon are collected in the same time window while cuttings from different horizons or formations are collected in sequential time windows as the drill bit moves on.

Figure 5B:
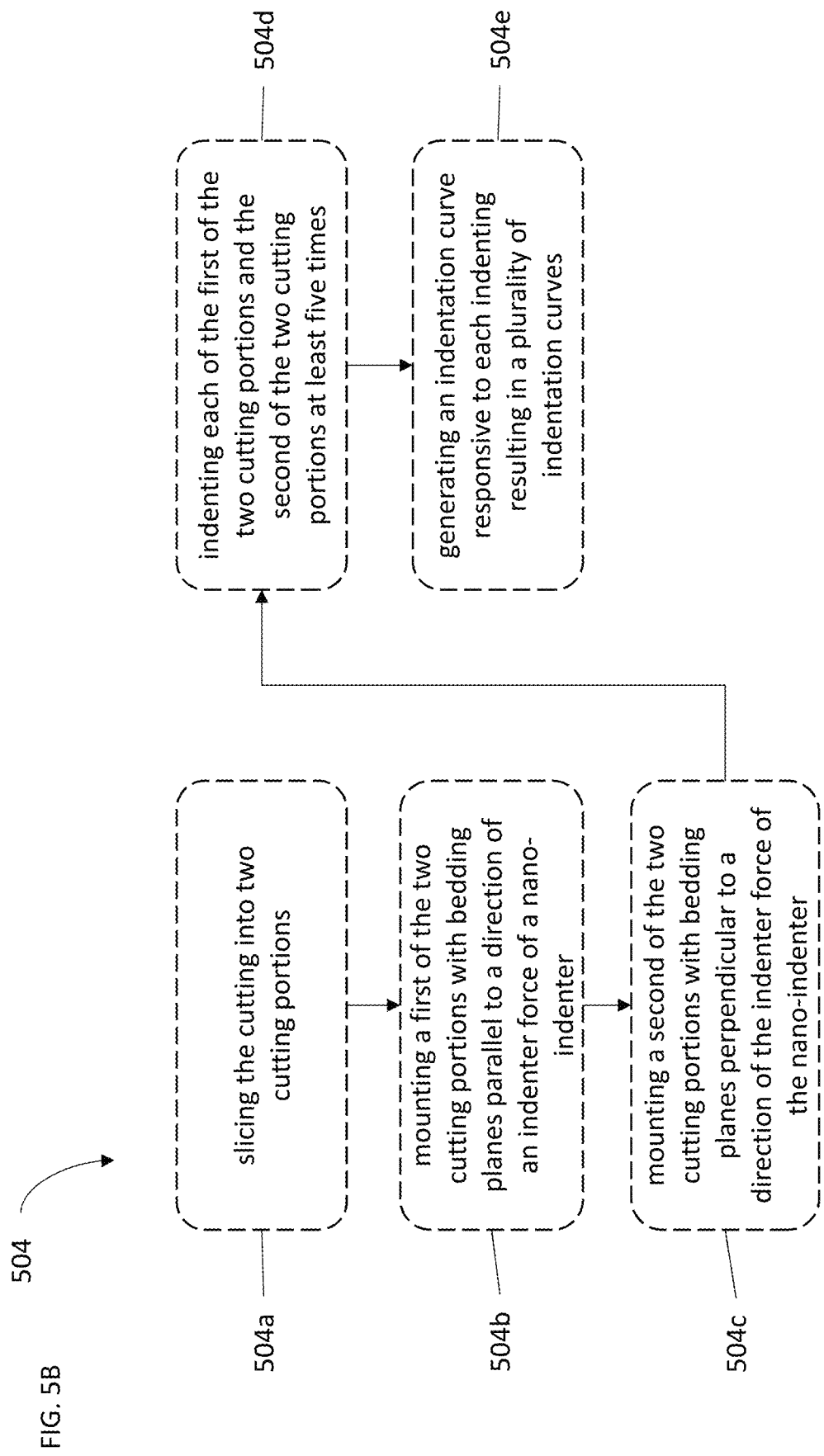

Step 504 of the method 500 can include several sub-steps, such as those shown in FIG. 5B. At 504a, the cutting 128 can be sliced or split into two cutting 128 portions along the bedding planes of the cutting 128. At 504b, a first of the two cutting 128 portions can be mounted with bedding planes parallel to a direction of an indenter force of a nano-indentation test apparatus 200. In other words, to a first cutting portion of the two cutting 128 portions, a nano-indentation force is applied in a direction parallel to bedding planes of the first cutting portion. At 504c, a second of the two cutting 128 portions can be mounted with bedding planes perpendicular to a direction of the indenter force of the nano-indentation test apparatus. In other words, to a second cutting portion of the two cutting 128 portions, a nano-indentation force is applied in a direction perpendicular to bedding planes of the two cutting 128 portions. At 504d, each of the first of the two cutting 128 portions and the second of the two cutting 128 portions can be indented five to 10 times. At 504e, an indentation curve responsive to each indenting test can be generated resulting in multiple indentation curves (five to 10 curves). The various stiffness parameters that are determined from the multiple indentation curves per one sample tested, are better estimated by averaging the slopes of the load vs displacement loading or unloading curves.

Referring back to FIG. 5A, at 506, the mechanical properties of the multiple cuttings 128 are determined based on results of the nano-indentation tests at the wellbore drilling site 100. The mechanical properties of the multiple cuttings 128 include stiffness transverse isotropy properties of the cuttings 128. For example, the transverse isotropic parameters can include E1, E3, C44 and C66. The mechanical properties of the cuttings 128 can be determined based on the results of the nano-indentation tests. Such results can include generating a log of the mechanical properties over the period of time. After determining the mechanical properties of the cuttings 128 using the results of the nano-indentation tests, mechanical properties of the wellbore can be determined, as well as using the mechanical properties of the cuttings 128

Figure 5C:
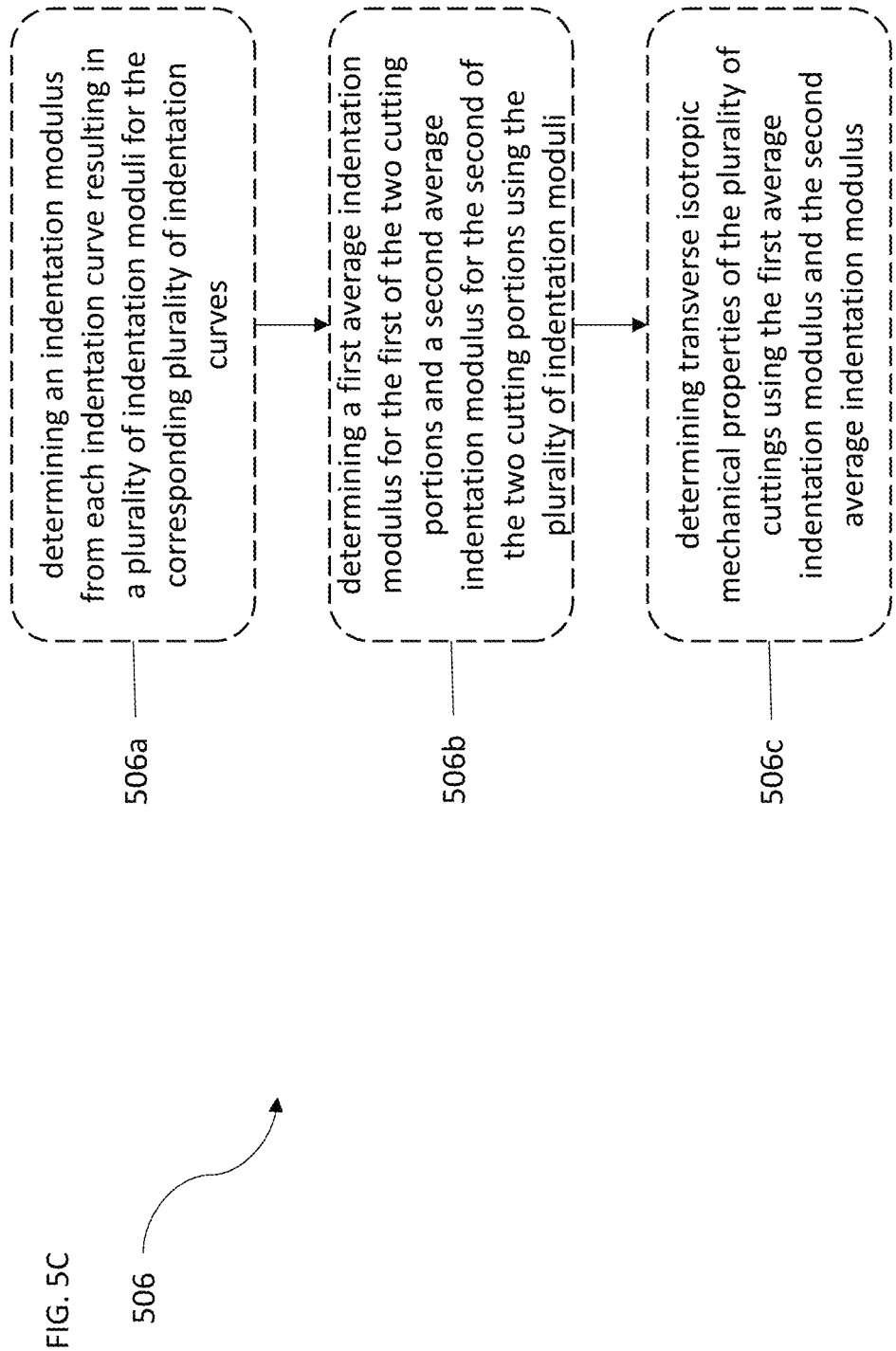

Step 506 of the method 500 can include several sub-steps, such as those shown in FIG. 5C. At 506a, an indentation modulus is determined from each indentation curve resulting in a multitude of indentation moduli for the corresponding multiple indentation curves. At 506b, a first average indentation modulus for the first of the two cutting 128 portions and a second average indentation modulus for the second of the two cutting 128 portions is determined using the multitude of indentation moduli. At 506c, the transverse isotropic mechanical properties of the multiple cuttings 128 are determined using the first average indentation modulus and the second average indentation modulus.

A hydraulic fracturing operation within the wellbore 106 can be planned based on the mechanical properties of the wellbore 106. In addition, drilling operations to drill one or more other wellbores adjacent the wellbore formations drilled 106 can be planned based on the mechanical properties of the wellbore rock formation drilled 106. The one or more other wellbores can be drilled based on the planning. Additional applications of the mechanical properties include, for example, dipole log calibration and developing a mechanical well log using, for example, the mechanical properties described using the nano-indentation test apparatus 200 and based on the location in the formation from which the cuttings 128 were retrieved. The mechanical parameters determined by nanoindentation can be used in empirical, semi-empirical, or analytical relations to determine/estimate various failure parameters (e.g., cohesion, friction angle, tensile strength) associated with wellbore stability.

Returning to FIG. 1, the drill cuttings saturated mud 112 becomes cleaner mud (less large cutting sizes) 114 after it passes through the shaker table 122 and into the mud tank 124. From the mud tank 124, the clean mud 114 flows through a second flow path 126 to a mud pump 134. The second flow path 126 can include piping, hoses, open conduits, any other flow path, or any combination. The mud pump 134 can be any type of pump, for example, a triplex plunger pump. From the mud pump 134, the clean mud 114 flows through a third flow path 150 to the drill string 108. The third flow path 150 can include piping, hoses, open conduits, any other flow path, or any combination. The process continues until the wellbore 106 has been fully formed and drilling operations have ceased. Cuttings 128 can be continuously collected from the shaker table 122 and tested in the onsite production lab 102.

Thus, particular implementations of the subject matter have been described. Other implementations are within the scope of the following claims.

What is claimed is:

1. A method comprising:
    receiving, at a surface of a wellbore being drilled at a wellbore drilling site, a plurality of cuttings in a raw unprocessed state that result from drilling the wellbore;
    performing, at the wellbore drilling site, nano-indentation tests on each cutting of the plurality of cuttings in the raw unprocessed state; and
    determining, at the wellbore drilling site, mechanical properties of the plurality of cuttings in the raw unprocessed state based on results of the nano-indentation tests.

2. The method of claim 1, wherein the mechanical properties of the plurality of cuttings comprise stiffness transverse isotropy properties of the plurality of cuttings.

3. The method of claim 1, wherein the nano-indentation tests are performed over a period of time, and wherein determining the mechanical properties of the plurality of cuttings based on the results of the nano-indentation tests comprises generating a log of the mechanical properties over the period of time.

4. The method of claim 1, wherein performing the nano-indentation tests comprises indenting each cutting of the plurality of cuttings with an indentation load ranging between 1 milli-Newton (mN) and 100 mN.

5. The method of claim 4, wherein the indentation loads are increased or decreased in multiples of 10.

6. The method of claim 1, wherein performing the nano-indentation tests comprises indenting each cutting of the plurality of cuttings to a depth greater than a surface roughness of the cutting.

7. The method of claim 6, wherein the depth is at least one micrometer.

8. The method of claim 1, wherein performing a nano-indentation test on a cutting of the plurality of cuttings comprises:
    slicing the cutting into a first cutting portion and a second cutting portion;
    mounting the first cutting portion with bedding planes that are parallel to a direction of an indenter force of a nano-indentation test apparatus; and
    mounting the second cutting portion with bedding planes that are perpendicular to the direction of the indenter force of the nano-indentation test apparatus.

9. The method of claim 8, wherein performing the nano-indentation test on the cutting comprises:
    indenting the first and second cutting portions at least five times each; and
    generating an indentation curve responsive to each indentation of the first and second cutting portions to provide a plurality of indentation curves.

10. The method of claim 9, wherein determining, at the wellbore drilling site, the mechanical properties of the plurality of cuttings based on the results of the nano-indentation tests comprises:
    determining an indentation modulus from each indentation curve of the plurality of indentation curves to provide a plurality of indentation moduli respectively corresponding to the plurality of indentation curves; and
    determining a first average indentation modulus for the first cutting portion and a second average indentation modulus for the second cutting portion using the plurality of indentation moduli.

11. The method of claim 10, further comprising determining transverse isotropic mechanical properties of the plurality of cuttings using the first average indentation modulus and the second average indentation modulus.

12. The method of claim 1, wherein the wellbore is drilled in a shale formation, and wherein the plurality of cuttings comprises a plurality of shale cuttings.

13. The method of claim 1, further comprising:
    determining mechanical properties of the wellbore based on the mechanical properties determined of the plurality of cuttings in the raw unprocessed state; and
    planning a hydraulic fracturing operation within the wellbore based on the mechanical properties of the wellbore or planning drilling operations to drill one or more other wellbores adjacent the wellbore based on the mechanical properties of the wellbore.

14. The method of claim 1, wherein the nano-indentation tests are performed on each cutting of the plurality of cuttings at the wellbore drilling site without first embedding the cutting in epoxy.

15. The method of claim 1, wherein the nano-indentation tests are performed on each cutting of the plurality of cuttings at the wellbore drilling site without first polishing the cutting.

16. A method comprising:
- while drilling a wellbore in a geologic formation at a wellbore drilling site, collecting a plurality of cuttings in a raw unprocessed state resulting from drilling the wellbore;
- performing, at the wellbore drilling site, nano-indentation tests on each cutting of the plurality of cuttings in the raw unprocessed state;
- determining mechanical properties of the plurality of cuttings using results of the nano-indentation tests; and
- determining mechanical properties of the wellbore using the mechanical properties determined of the plurality of cuttings in the raw unprocessed state.

17. The method of claim 16, wherein the plurality of cuttings comprises a plurality of shale cuttings.

18. The method of claim 16, wherein performing the nano-indentation tests comprises indenting each cutting of the plurality of cuttings to a depth greater than a surface roughness of the cutting.

19. The method of claim 16, wherein performing the nano-indentation tests comprises:
- splitting each cutting of the plurality of cuttings into a first cutting portion and a second cutting portion;
- applying a first nano-indentation force to the first cutting portion in a direction parallel to bedding planes of the first cutting portion; and
- applying a second nano-indentation force to the second cutting portion in a direction perpendicular to bedding planes of the second cutting portion.

20. A method comprising:
- while drilling a wellbore in a geologic formation at a wellbore drilling site, collecting a plurality of shale cuttings in a raw unprocessed state resulting from drilling the wellbore;
- performing, at the wellbore drilling site and while drilling the wellbore, nano-indentation tests on each cutting of the plurality of shale cuttings without performing any intermediate processing the plurality of shale cuttings such that the plurality of shale cuttings are in the raw unprocessed state during the nano-indentation tests, wherein a nano-indentation on a shale cutting comprises indenting the shale cutting to a depth greater than a surface roughness of the shale cutting;
- determining mechanical properties of the plurality of shale cuttings in the raw unprocessed state using results of the nano-indentation tests; and
- determining mechanical properties of the wellbore using the mechanical properties determined of the plurality of shale cuttings in the raw unprocessed state.

21. The method of claim 20, further comprising:
- transporting each cutting of the plurality of shale cuttings to a nano-indentation test apparatus at the wellbore drilling site; and
- performing the nano-indentation tests using the nano-indentation test apparatus.

* * * * *